United States Patent [19]

Vogel

[11] 4,422,691
[45] Dec. 27, 1983

[54] PASSENGER SEAT

[76] Inventor: Ignaz Vogel, Kleinsteinbacher Str. 44, Karlsruhe 41, Fed. Rep. of Germany, 7500

[21] Appl. No.: 274,491

[22] Filed: Jun. 17, 1981

[30] Foreign Application Priority Data

Jun. 18, 1980 [DE] Fed. Rep. of Germany ....... 3022640

[51] Int. Cl.³ ............................................. A47C 4/02
[52] U.S. Cl. .................................... 297/440; 297/183; 297/232; 297/445
[58] Field of Search ............... 297/232, 445, 440, 396, 297/391, 183, 449, 450; 52/710, 729

[56] References Cited

U.S. PATENT DOCUMENTS

| Re. 29,522 | 1/1978 | Barecki | 297/232 |
|---|---|---|---|
| 596,986 | 1/1898 | Demarest | 297/232 X |
| 827,613 | 7/1906 | Brown | 52/710 X |
| 992,877 | 5/1911 | Kahn | 52/710 |
| 2,345,650 | 4/1944 | Attwood | 52/710 X |
| 2,380,379 | 7/1945 | Attwood | 52/710 X |
| 2,839,125 | 6/1958 | Brandon | 297/396 |
| 3,147,997 | 9/1964 | Mason | 297/396 X |
| 3,166,285 | 1/1965 | Downes | 52/729 X |
| 3,619,006 | 11/1971 | Barecki | 297/232 X |
| 3,870,363 | 3/1975 | Barecki | 297/232 |
| 3,885,766 | 5/1975 | Resch et al. | 297/232 X |
| 4,099,780 | 7/1978 | Schmidhuber | 297/232 X |
| 4,152,023 | 5/1979 | Buhk | 297/445 X |

FOREIGN PATENT DOCUMENTS

| 2204076 | 1/1972 | Fed. Rep. of Germany | 297/232 |
|---|---|---|---|
| 650239 | 2/1951 | United Kingdom | 52/710 |

Primary Examiner—James T. McCall
Attorney, Agent, or Firm—Klaus J. Bach

[57] ABSTRACT

A passenger seat structure for installation in vehicles such as buses, railroad cars, boats and airplanes consists of a support frame provided with support legs. The frame includes two beams having top and bottom channels with seat and leg mounting means slidably disposed therein. The seat includes seating and backrest support plates mounted at their edges to support tubes and carrying upholstery members.

With this arrangement the legs and the seats, which are light in weight, can be positioned at any point along the support beams.

4 Claims, 3 Drawing Figures

PASSENGER SEAT

BACKGROUND OF THE INVENTION

The invention relates to a passenger seat for installation in vehicles, boats or airplanes which seat consists of a support frame having support legs and carrying a seat and a backrest.

Passenger seats should not only be comfortable and attractively styled like normal seating furniture, they must also be safe during operation of the vehicle in which they are installed. Passenger seats, being subjected to much tougher wear and tear than normal seats, therefore need to be very sturdy; they must be capable of withstanding impacts resiliently and without forming splinters; they should remain rattle-free for a long period of operation and yet they should be lightweight. It is also very important that the passenger seats are economical to manufacture and economical to maintain by providing for ready exchangeability of parts subjected to wear. Furthermore, it should be easy to install the passenger seats in the respective vehicles and to adjust them to the desired arrangements and the space available. For economical shipping and storage, especially if manufactured in large quantities, these passenger seats should also have small packaged volume, that is, it should be possible to ship them disassembled into components. The passenger seats known so far do not have these desired properties. They are rather built very sturdily such that they are capable of withstanding safely their projected life and that they do not rattle during such life. The other desired objectives mentioned above are not taken into consideration. Those passenger seats are therefore not only very expensive but also relatively heavy such that vehicles equipped with such seats always have a relatively high deadweight.

SUMMARY OF THE INVENTION

A passenger seat structure for installation in vehicles such as buses, railroad cars, boats and airplanes in accordance with the present invention has a support frame consisting of seat support beams mounted on legs and seating and backrest members mounted on top of the beams. The beams are so formed as to have upper and lower channels and mounting means are slidably disposed in the channels, permitting mounting of the seat and backrest members on the top and mounting of the legs below the beams at any point along the beams. Preferably, the seat and backrest members include the support plates mounted with their edges to tubular support members.

Seat structures are easily assembled into any desired form, with different seat distances and leg distances. Only support beams of different lengths are needed and even these can be cut as desired. All other parts are the same for any desired seating arrangement.

Contrary to prior art-type passenger seats which were designed for a particular application, for a particular vehicle and for predetermined seating arrangements, the passenger seat according to the invention has a support frame which carries support plates adapted to have various seat members mounted thereon. This particular type of support frame structure easily permits sideward movement of the seating members mounted thereon such that the arrangement is easily adjustable to particular space conditions. It is also possible to mount different types of seats on the seating and backrest plates which can be easily mounted and removed without large expenses of time and money. Worn parts are easily exchanged. The seat is composed of various building elements which can be shipped inexpensively with relatively little shipping volume, and this is advantageous for the shipping of complete seat structures as well as for replacement parts for such seats.

Rigidity of the seats according to the present invention is derived from the particular arrangement of the seat support frame, as well as the interconnection of the mounting plates and their support tubes. It is pointed out that the seat support beams may be mounted on the support legs in such a manner that they will be evenly loaded by the design weight and that they are capable, because of the distance between them, of withstanding relatively high torques as may occur if passengers hit the backrests during an accident. The support beams may be so selected and so arranged that they are deformed and absorb energy if a predetermined torque is exceeded in order to prevent injuries to persons thrown against the seats in front of them during an accident.

The design of the seat and backrest structures is such that the cross-members, considered to be necessary so far, could be omitted. Rigidity of these structures is achieved by connecting the support tubes to the edges of the mounting plates. The rigidity achieved that way is sufficient with regard to all requirements that could be expected; but, during an accident, it will permit deformation especially by proper selection of the mounting plate materials, that is, during an accident, the crash energy will be absorbed.

The basic seats may be provided with upholstery parts or any other necessary accessories without any further mounting or connecting members. Not only the seating members may be mounted onto the mounting plates, preferably by mounting clips, but the covers hiding the mounting plates may also be designed and formed, particularly at the backside of the backrest, to contribute to the consumption of crash energy during an accident. At the same time, the covers may have handles, ashtrays, luggage nets or table plates associated therewith. It may also be pointed out that support rods, handles or armrests may be associated with the support beams of the seat support structure in any desired position. It is also easily possible to provide for a headrest by inserting a tubular bridge member into the upper ends of the backrest support tubes and by mounting the headrest on such bridge member.

The present invention accordingly provides for a passenger seat arrangement which is usable universally in connection with various types of passenger seats and with various types of vehicles which may offer different amounts of space. Furthermore, the arrangement according to the invention is lightweight because of its special structure, it may be manufactured economically, it can easily be shipped and set up, and it is easy to maintain.

DESCRIPTION OF THE PREFERRED EMBODIMENT

Figure 1:
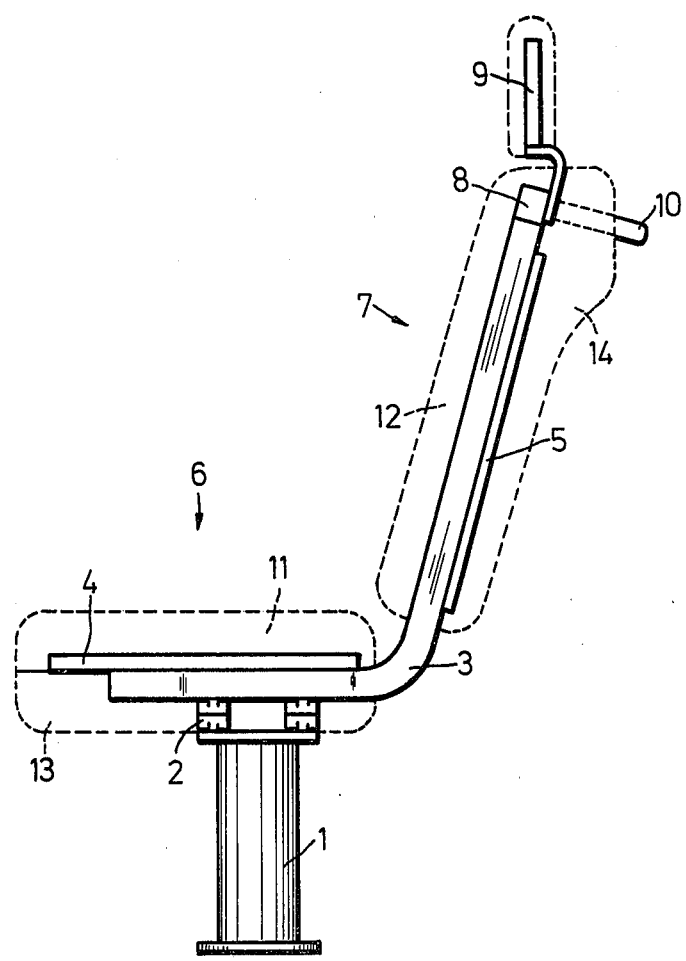
FIG. 1 is a side view of the seat structure.
Figure 2:
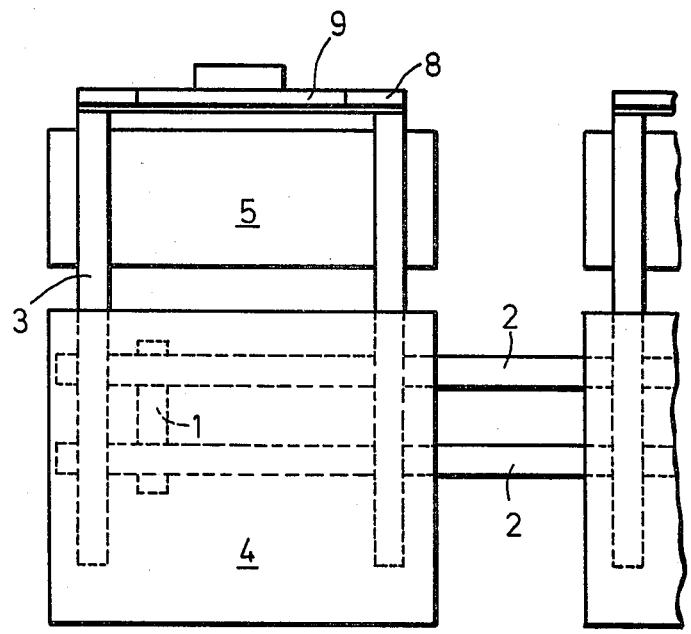
FIG. 2 is a top view of the seat structure.

As shown in FIG. 1 the seat structure according to the invention has support legs 1 which carry two spaced support beams 2. Mounted on the support beams 2 are mounting tubes 3 which are interconnected by mounting plates 4, 5 for the seating member 6 and the backrest 7, respectively. The upper ends of the mounting tubes 3 are interconnected by a bridging tube 8. The bridging tube 8 has a headrest 9 and a handle 10 mounted thereon. The mounting plates 4, 5 carry upholstery members 11, 12 for the seat 6 and the backrest 7 as well as cover portions 13, 14.

Figure 3:
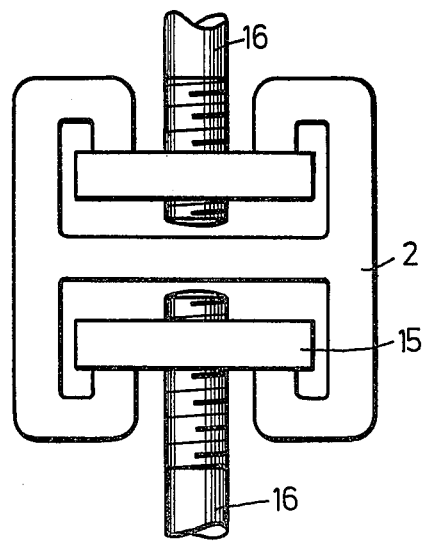
FIG. 3 is a partial side view of a seat support beam.

FIG. 3 shows in detail how the support beams 2 are mounted on the support legs and how the mounting tubes are connected to the support beams 2. The double-C-shaped support beams have threaded plates 15 captured therein and bolts 16 are threaded into the plates 15, the lower bolts mounting the support beams 2 on the legs 2 and the upper bolts 16 mounting the mounting tubes 3 on the support beams 2.

This arrangement permits the mounting of the support legs at any point along the support beams 2 so that the seat support frame may be easily adjusted to the available space; it also permits the mounting of the support tubes 3, that is, the seats, at any point along the support beams 2 wherever they are desired. It is pointed out that the mounting of the support beams 2 to the legs 1 and mounting of support tubes 3 on the support beams 2 are independent of each other which, all together, provide for universal applicability of the seating arrangement according to the invention.

Preferably, the seat frame consists of a lightweight metal and the seating and backrest support plates consist of wood or plastic or they are sandwiched structures and have mounting elements incorporated therein.

What I claim is:

1. A passenger seating arrangement for installation in vehicles such as buses, railroad cars, boats and airplanes, said seating arrangement comprising: a support frame consisting of support legs with at least two seat support beams mounted on, and interconnecting, said legs, at least one seat mounted on said support frame, said seat including two support tubes mounted on said support beams, a seating plate mounted on top of said support tubes and a backrest plate mounted behind said support tubes, the seating and backrest plates being interconnected by said support tubes, said support tubes having open upper ends, upholstery members mounted on top of the seating and the front of the backrest plates and cover parts mounted on the rear of said backrest plate, a bridging tube inserted into the open ends of said support tubes, said bridging tube carrying a headrest, and a handle integral with said bridging tube and projecting rearwardly therefrom beyond the cover parts of said backrest plate.

2. A passenger seat as claimed in claim 1, wherein said seating and backrest support plates consist of wood.

3. A passenger seat as claimed in claim 1, wherein said seating and backrest plates are plastic plates with mounting elements incorporated therein.

4. A passenger seat as claimed in claim 1, wherein said seating and backrest plates are of sandwiched structure.

* * * * *